Figure 1:
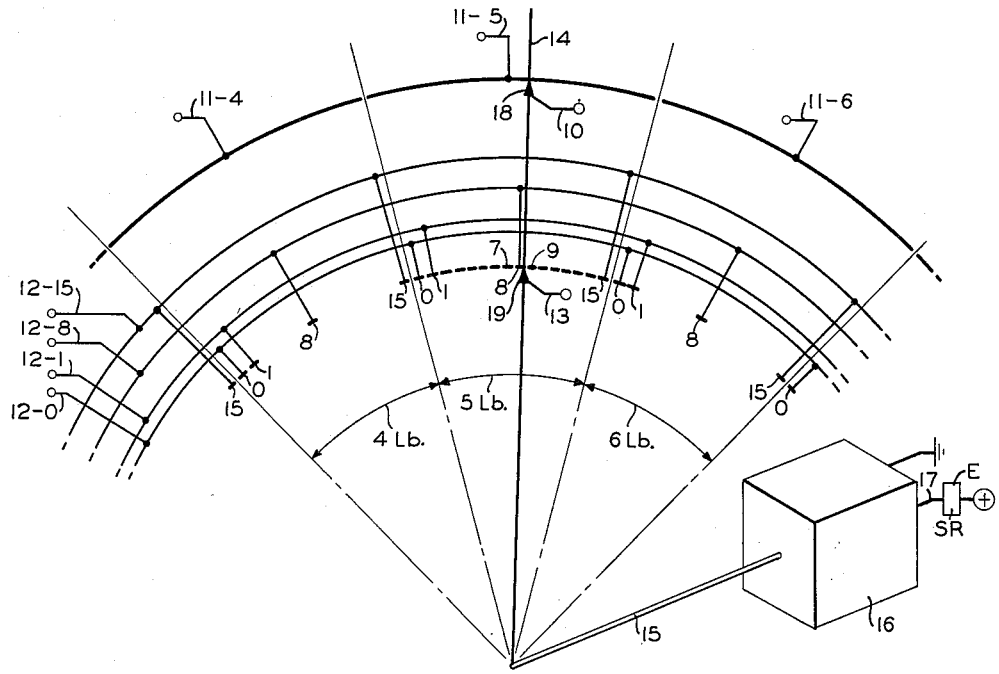

Nov. 3, 1964    M. I. RACKMAN    3,155,182
SCALE ANNUNCIATOR
Filed Dec. 28, 1962    2 Sheets-Sheet 1

PAN CONTROLLED
SWITCH

INVENTOR
M. I. RACKMAN

United States Patent Office 3,155,182
Patented Nov. 3, 1964

3,155,182
SCALE ANNUNCIATOR
Michael I. Rackman, 549 Ocean Parkway, Brooklyn, N.Y.
Filed Dec. 28, 1962, Ser. No. 248,030
13 Claims. (Cl. 177—45)

This invention relates to announcement machines and more particularly to machines for announcing the weight of an object as determined by a weighing or scale mechanism.

Scales to be found in supermarkets, butcher shops, etc. generally provide only a visual display of the weight of the weighed object. A scale which provides an equivalent verbal announcement as well as the visual indication would be highly advantageous for a variety of reasons. Often, the visual indication is not readily viewed by the customer. At times, a customer searching for change to pay for the merchandise forgets to look at the visual indication and then must ask the clerk to reweigh the object, especially if he considers the clerk's announcement of the weight to be excessive. These and other difficulties are avoided if an announcement of the weight is automatically made to the customer.

It is not sufficient for only the number of pounds to be announced, as has heretofore been suggested, as most objects weighed in supermarkets, etc. are sold by the number of ounces as well as pounds. If a separate announcement is provided for every pound-ounce combination, however, the resulting announcement mechanism may be too complex to be manufactured and sold at a reasonable cost in comparison to the scale itself. Also, the physical proportions of the machine may be excessive.

It is a general object of this invention to provide an improved announcement machine for operating with a weighing mechanism.

It is another object of this invention to provide an announcement machine of simple construction for announcing both pounds and ounces, or any other type of combination of announcements desired.

It is another object of this invention to provide an announcement machine for announcing all pound-ounce combinations within a specific range without requiring a recording of every combination, and wherein only recordings of each pound within the range and recordings of only the 16 ounce subdivisions are required.

It is still another object of this invention to provide an announcement machine wherein a single playback mechanism is utilized both for announcing the number of pounds and the number of ounces, and whatever other announcement it is desired to make, e.g., "Thank you, please call again."

It is still another object of this invention to provide an announcement machine wherein the announcement is not initiated until the weighing pan comes to rest, and wherein the announcement is completed even if the weighed object is removed before the termination of the announcement.

Briefly, in accordance with the illustrative embodiment of the invention a first group of magnetic cores is provided, each one of which is associated with a respective pound range. A second group of magnetic cores is also provided, each one of which is associated with a respective one of the 16 (0–15) ounce ranges, the same core being associated with the same respective ounce range within each pound range. One of the cores in the first group and one of the cores in the second are set each time an object is weighed. The two set cores represent respectively the number of pounds and the number of ounces of the weighed object.

A closed loop magnetic tape has recorded thereon in succession the following announcements: "No pounds, one pound, two pounds … and no ounces, and one ounce, and two ounces … and fifteen ounces." When the pan containing the merchandise comes to rest one core of each group is set. A motor then begins to rapidly rotate a wheel along whose circumference the circular magnetic tape is fixed. The tape passes under a single read-out head which is connected through an amplifier to a speaker. The connection is broken however when the motor first operates. The wheel contains a wiper fixed therein. A plurality of conductors each threading one of the registering cores terminate at the perimeter of the wheel, and as the wheel rotates the wiper makes contact with each of the conductors in turn. A potential source connected to the wiper causes a current to be applied to each successive conductor which in turn resets the associated core. A common read-out conductor threads all of the cores. If for example, the number of pounds registered is three, reset pulses are applied to cores 0, 1 and 2 in the first group in succession. These cores, having not been set to begin with, do not reset, and no pulse is induced in the common read-out conductor. When the wiper touches the conductor threading core 3 however, this core resets from the set state, and a pulse is induced in the common read-out conductor. This pulse causes the completion of the connection from the read-out head to the amplifier and speaker, and at the same time causes the motor to slow up. At this time that part of the announcement beginning with "three pounds" is under the read-out head, and as the wheel and tape rotate more slowly the "three pounds" announcement is heard at the speaker.

A monostable multivibrator determines the time period during which the motor is slowed and the read-out head is connected to the amplifier and speaker. This time is just adequate for reading out the "pound" announcement. Just as the pound announcement terminates the monostable multivibrator reverts to its stable state. The read-out head-amplifier connection is broken, and at the same time the motor speeds up. The wiper rapidly makes contact with the remaining conductors associated with the other pound registering cores. These cores are all in the reset state, however, and no subsequent read-out action occurs during this time. As the wheel and tape continue to rapidly rotate the wiper now makes contact with the conductors associated with respective ounce registering cores. When the ounce registering core that was set is reset, as a result of the wiper making contact with the associated conductor, the induced pulse in the comon read-out conductor once again triggers the monostable multivibrator. At this time that part of the announcement beginning with the number of registered ounces is under the read-out head. The triggering of the monostable multivibrator slows up the motor, and causes the read-out head to be connected to the amplifier and speaker. The "ounce" announcement is now read out. At the termination of the ounce announcement the monostable multivibrator reverts to its stable state, and again the read-out head-amplifier connection is broken and the motor speeds up. The wheel and tape continue to rotate until they are in their initial position. The mechanism is thus prepared to announce the weight of the next object to be weighed.

It is seen therefore that a single read-out mechanism selectively reads out a particular announcement in each of the two groups. All pound-ounce combinations are possible without requiring a separate announcement for each pair. A single two speed motor is utilized both for selecting those two parts of the tape to be read, and for advancing the tape during the read-out sequence. A limited number of registering devices is required, and these devices may comprise reliable and inexpensive magnetic cores.

It is a feature of this invention to provide two pluralities of registering devices, one for registering the number of pounds, and the other for registering the number of ounces of a weighed object.

It is another feature of this invention to provide a continuous recording containing thereon successive pound announcements followed by successive ounce announcements, and a single read-out mechanism for operating in conjunction with the recording.

It is another feature of this invention to provide a single motor for advancing the recording at both a fast speed, and a slower speed suitable for read-out.

It is another feature of this invention to operate the motor at the fast speed until the read-out mechanism is adjacent that portion of the recording containing thereon the pound announcement as represented in the first plurality of registering devices, and to then operate the motor at the slower rate while reading out the pound announcement.

It is another feature of this invention to operate the motor at the faster rate after the termination of the pound announcement until that part of the recording containing the beginning of the ounce announcement as represented in the second plurality of registering devices is adjacent the read-out mechanism, and to then operate the motor at the slower speed until the ounce announcement is read out.

It is another feature of this invention to operate the motor at the faster rate after the ounce announcement is completed until the recording is at its initial position in preparation for the next object to be weighed.

It is another feature of this invention to delay the registration of the number of pounds and ounces of the object being weighed in the two pluralities of registering devices and the operation of the motor until the pan on which the object is placed comes to rest.

It is still another feature of this invention to complete the announcement operation even if the weighed object is removed from the weighing pan prior to the termination of the announcement.

Figure 3:
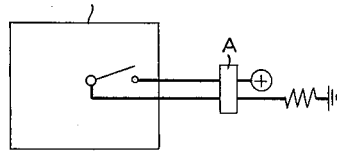
Figure 2:
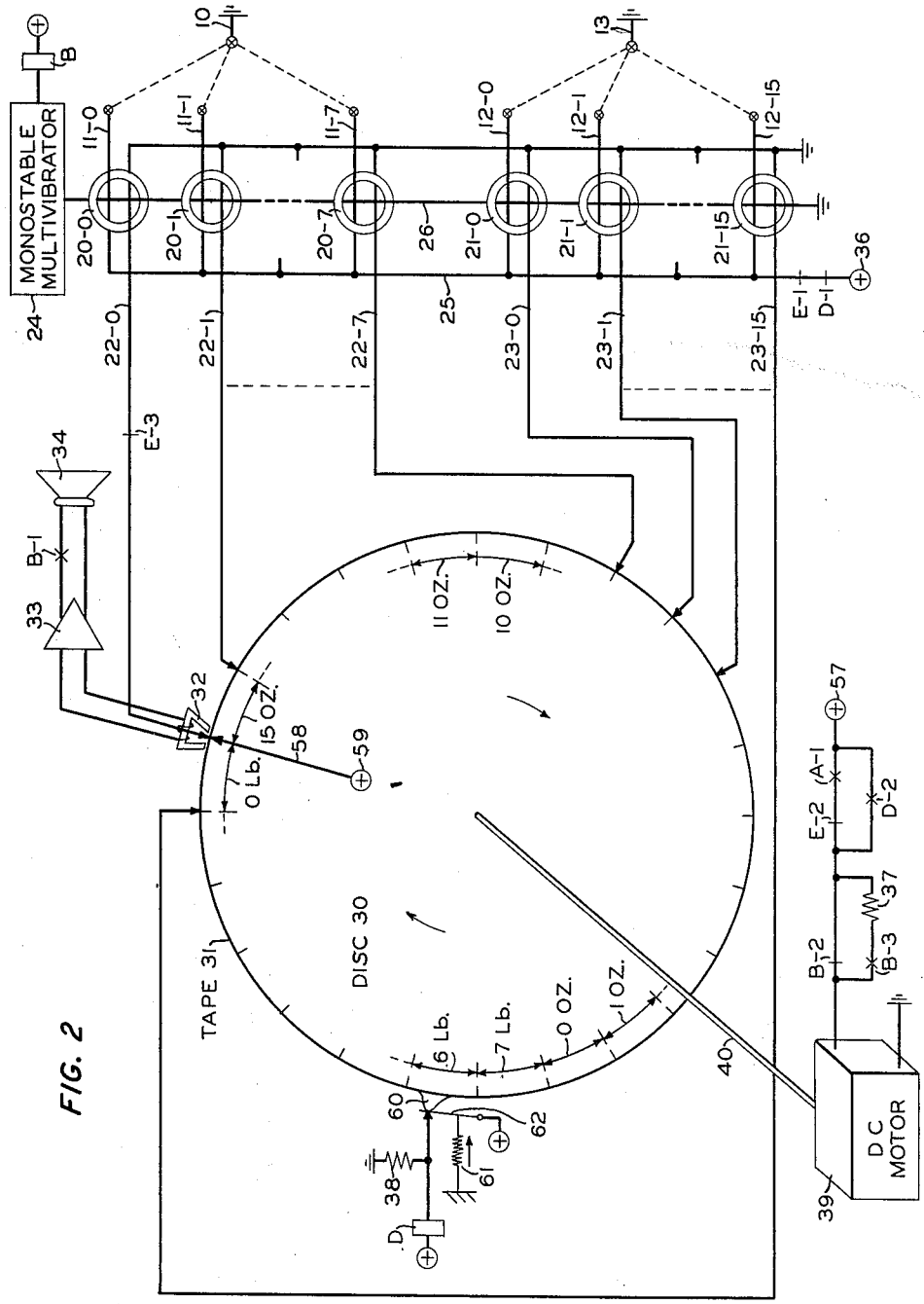

Further objects, features and advantages of the invention will become apparent upon consideration of the following detailed description in conjunction with the drawing in which:

FIGS. 1–3 together disclose an illustrative embodiment of the invention to be used with a weighing mechanism.

In FIG. 1 are shown three pound ranges on the visual scale of a weighing machine, and the indicator 14 which identifies the weight of the object. Only ranges 4, 5 and 6 are shown, but the scale of the illustrative embodiment of the invention can register up to 7 pounds and 15 ounces. Within each pound range is shown a metallic contact connected to a respective one of conductors 11–4 through 11–6. Conductor 10 is connected to a contact 18 fixed on indicator 14. As the indicator moves around pivot 15 a path is completed from conductor 10 to one of conductors 11–4 through 11–6, or from conductor 10 to one of the equivalent conductors associated with the other pound ranges.

Within each pound range are also 16 metallic contacts each of which is connected to one of conductors 12–0 through 12–15. Conductor 13 is connected to a contact 19 fixed to indicator 14, and as the indicator rotates around pivot 15 a path is completed from conductor 13 to one of the sixteen conductors 12–0 through 12–15. The path is completed from conductor 13 to one of these sixteen conductors independent of the pound range in which indicator 14 comes to rest. The conductor chosen is that one associated with the ounce range within which indicator 14 comes to rest.

Transducer 16 may be any of many standard devices for grounding conductor 17 as long as pivot 15 is in motion. Slow-release relay E is operated whenever indicator 14 is in motion. The relay releases only when the indicator comes to rest. The moment the object being weighed is placed in the weighing pan indicator 14 starts rotating in the clockwise direction. Relay E thus operates. Although the indicator may overshoot its final position and thus come to rest before beginning to move in the counterclockwise direction, relay E does not immediately release, relay E being a slow-release relay. Only when the indicator finally comes to rest does relay E release. The release of relay E is an indication that the registering cores may register the number of pounds and ounces indicated by the position at which indicator 14 has come to rest, and that the motor and read-out mechanism may begin to operate.

On FIG. 2 are shown the selective connections of conductors 11–0 through 11–7 to conductor 10, and conductors 12–0 through 12–15 to conductor 13. The connections themselves, depending on the position of indicator 14, are shown by the dotted lines. Conductors 10 and 13 are grounded, and depending on the weight of the object being weighed, one of conductors 11–0 through 11–7, and one of conductors 12–0 through 12–15 are grounded.

Contacts D–1 are closed at the beginning of the announcement operation. Although contacts E–1 are also normally closed, the instant that indicator 14 starts to move relay E operates, and contacts E–1 open. Thus when the scale is first operated potential source 36 is not connected to conductor 25. However when the pan comes to rest and relay E releases, source 36 is connected to conductor 25. At this time as one of conductors 11–0 through 11–7 and one of conductors 12–0 through 12–15 are grounded, current flows through the apertures of the two respective cores. One of cores 20–0 through 20–7 and one of cores 21–0 through 21–15 are set with a counterclockwise flux. All of the other 22 cores remain reset with a clockwise flux.

The release of relay E not only causes the registering of the number of pounds and the number of ounces of the object being weighed in the two groups of cores, but in addition, causes motor 39 to begin operating. Relay A in FIG. 3 is controlled by a switch which is closed whenever the weighing pan is depressed. Thus relay A is operated for as long as the object being weighed remains in the weighing pan. Although contacts A–1 on FIG. 2 are thus closed when the object is first placed in the pan, motor 39 does not operate. Contacts E–2 remain open while indicator 14 is in motion. When the indicator comes to rest however and relay E releases, contacts E–2 close. At this time source 57 is connected through contacts A–1, E–2 and B–2 to motor 39. The motor begins operating and turns shaft 40 at a fast rate in the clockwise direction. This in turn causes disc 30 to rotate at the same fast speed in the clockwise direction.

Along the periphery of disc 30 is a continuous magnetic tape 31. On this tape are recorded 24 announcements of equal lengths. The first announcement is "No pounds." The second is "one pound," etc., through the eighth announcement of "seven pounds." The next announcement is "and no ounces," folowed by "and one ounce," etc., through "and fifteen ounces." Read-out head 32 is fixed adjacent tape 31 as shown, and as disc 30 rotates in the clockwise direction read-out head 32 reads out the successive announcements. Amplifier 33 amplifies the signals, and if contacts B–1 are closed the announcement being read out is heard at speaker 34.

Wiper 58 is fixed to disc 30 and as the disc rotates in a clockwise direction the potential of source 59 is successively applied to conductors 22–0 through 23–15.

When disc 30 is in its initial position, as shown in FIG. 2, relay D is unoperated. Both ends of the relay winding are connected to positive potential sources of the same magnitude, and no current flows through the relay coil. However when disc 30 rotates and cam 60 moves away from contact 62, spring 61 forces this contact away from the contact connected to the junction of resistor 38 and the winding of relay D. At this time current flows through resistor 38 and the relay winding, both ends of the winding no longer being connected to the same potential. Relay D remains operated until one complete revolution of disc 30 is completed. At this time cam 60 once again forces contact 62 to the left and relay D releases. Cam 60 is fixed to a face of disc 30 rather than at the periphery in order not to interfere with tape 31.

When indicator 14 comes to rest contacts E–1 and E–2 close; two of the registering cores are set, and motor 39 causes disc 30 to rapidly rotate in the clockwise direction. When the disc first moves relay D operates. Contacts D–1 open and source 36 is no longer connected to any of conductors 11–0 through 12–15. This insures that during the succeeding announcement cycle the registering cores are not erroneously set by the motion of indicator 14 in the event the weighed object is removed and the indicator falls back to its initial position. In addition, contacts D–2 close. In the event the object being weighed is removed and contacts E–2 or A–1 open, motor 39 still operates as these contacts are now shorted by closed contacts D–2.

Source 59 is first applied through wiper 58 to conductor 22–0. The current flowing through conductor 22–0 is in a direction to reset core 20–0. If the core was previously set, indicating that the merchandise weighs less than one pound, it is now reset and a pulse is induced in conductor 26. This pulse triggers monostable multivibrator 24. When the multivibrator is placed in its unstable state relay B is operated. Contacts B–1 close and amplifier 33 is now connected to speaker 34. The speaker is thus enabled with the beginning of the "no pounds" announcement under head 32. At the same time contacts B–2 open, and contacts B–3 close. Resistor 37 is now in series with motor 39 and source 57, and reduced current flows from the source to the motor. The motor now operates at a slower speed, a speed suitable for reading out the announcement. As disc 30 continues to rotate the "no pounds" announcement is read out and heard at speaker 34.

The period of multivibrator 24 is adjusted so that the end of the "no pounds" announcement portion of tape 31 is under head 32 when the mulivibrator reverts to its stable state. At this time relay B releases, speaker 34 is no longer enabled, and motor 39 speeds up.

If core 20–0 was not set, it is not reset by source 59 being applied to conductor 22–0. No induced signal appears in conductor 26 and the multivibrator is thus not triggered. Motor 39 operates at the fast rate as the "no pounds" announcement passes beneath head 32. When wiper 58 contacts conductor 22–1 the beginning of the "one pound" announcement is under head 32. If core 20–1 was previously set it is now reset, and the monostable multivibrator is triggered. Relay B operates, and at this time the "one pound" announcement is heard as the speaker is now enabled and the motor is now operating at its slow speed. At the end of the "one pound" announcement relay B releases and the motor speeds up once again.

Similarly, if core 20–1 was not set it is not reset when source 59 is applied to conductor 22–1. The "one pound" portion of tape 31 also rapidly passes beneath head 32. The multivibrator is triggered only when current flows through that one of conductors 22–0 through 22–7 whose respective core 20–0 through 20–7 was previously set. At this time the beginning of the respective announcement is underneath head 32. Relay B operates, and the announcement is heard at the speaker. After the announcement relay B releases and the motor speeds up. In this manner the correct "pound" announcement is heard.

Contacts E–3 are provided to insure that core 20–0 sets in the event the weighed object is less than one pound. Wiper 58 contacts conductor 22–0 in the initial position, and were contacts E–3 not provided the current in conductor 22–0 would prevent current in conductor 11–0 from setting core 20–0. Contacts E–1 close when relay E releases prior to the closing of contacts E–2 and E–3. In this manner, if core 20–0 is to be set, when relay E first releases contacts E–1 close, and current through conductor 11–0 sets the core. Contacts E–2 and E–3 then close. The resetting current through conductor 22–0 is sufficient, even with the setting current in conductor 11–0 still present, to reset core 20–0. Relay B operates and the "no pounds" announcement is heard.

When the end of the "seven pounds" announcement, the beginning of the "and no ounces" announcement, is under head 32 source 59 is applied to conductor 23–0. If core 21–0 was previously set the multivibrator is now triggered for the second time, and the "and no ounces" announcement is heard in the same manner as was the "pound" announcement. Even if the pound announcement was "seven pounds" and the multivibrator reverted to its stable state at the end of the announcement, it is immediately retriggered when wiper 58 is connected to conductor 23–0. At the end of the "and no ounces" announcement relay B releases once again, and the motor speeds up.

If core 21–0 is not set the "and no ounces" announcement rapidly passes under head 32. When wiper 58 is connected to conductor 23–1 core 21–1 is reset if it was previously set. At this time the "and one ounce" announcement is read out. Similar remarks apply to all of the other announcements from "and two ounces" through "and fifteen ounces." For example, when the beginning of the "and fifteen ounces" announcement is under head 32 wiper 58 is connected to conductor 23–15. The monostable multivibrator is triggered and the "and fifteen ounces" announcement is read out.

After the "ounce" announcement relay B releases, the speaker is disenabled, and the motor speeds up. After one complete revolution of disc 30 relay D releases, and contacts D–2 open. If the object being weighed has by this time been removed from the weighing pan, contacts A–1 are similarly open, and the motor ceases to operate. The announcement mechanism is now ready for another cycle of operation when the next object is weighed. In the event that the weighed object is not removed when disc 30 is in its initial position contacts A–1 are still closed. Thus motor 39 continues to operate at the fast speed and once again relay D operates. However, no further announcements are heard. All of the cores are reset, including those two previously set. Although wiper 58 continues to cause source 59 to be applied in succession to conductors 22–0 through 23–15 no induced signals appear in conductor 26 as all the cores are reset. The multivibrator is not triggered and relay B does not operate. As contacts B–1 remain open no announcement is heard at the speaker. When the object is finally removed from the pan, relay A releases and contacts A–1 open. The motor continues to operate until relay D releases when disc 30 is next in its initial position. At this time contacts D–2 open, and as contacts A–1 are also open motor 39 ceases to operate. Relay D remains unoperated until another object is weighed and contacts A–1 and E–2 close.

It is thus seen that a single read-out mechanism selectively reads out "pound" and "ounce" announcements. All combinations are possible and are obtained by a reliable and inexpensive mechanism. By providing a two-speed motor there is a negligible time gap between the "pound" and "ounce" announcements. After the termination of the "pound" announcement disc 30 and tape 31 rapidly rotate until the desired "ounce" announcement is under head 32, at which time the motor slows down for the read-out. The invention is not limited to only "pound"-"ounce" combinations. Other announcements may be included on the tape, each having a respective registering core. For example, if it is always desired to read out "Thank you. Please call again," after the "ounce" announcement another core and respective resetting conductor may be incorporated in the circuit. This core may always be set during each weighing operation, e.g., by the operation of relay A. The motor speeds up after the "ounce" announcement, and after the "and fifteen ounces" portion of tape 31 passes under head 32 the additional core is reset. The additional announcement is heard at this time. It is even possible to announce the cost of the object being weighed. Two other pluralities of cores may be provided for registering the number of dollars and the number of cents (or, more economically, three pluralities for registering the number of dollars, the number of cents in 10 unit multiples, and the number of pennies in 10 unit multiples). A translator may be incorporated in the circuit to set the appropriate "price" cores depending upon the weight of the merchandise, and the unit cost.

Nor is the invention limited to announcements of equal lengths. The illustrative embodiment is so limited as monostable multivibrator 24 causes relay B to operate for only the same period of time during each operation. However, it will be apparent to those skilled in the art that variable length announcements may be read out. For example, an individual wiper connected to a positive potential source may be fixed on disc 30 at the beginning of each announcement, and a respective individual wiper connected to a negative potential source may be fixed on disc 30 at the end of each announcement. In place of the registering cores gating devices may be connected to conductors 22-0 through 23-15. Only two of these gating devices may be enabled depending upon the position of indicator 14. Each of these gating devices may operate relay B only when it is enabled, and when the respective wiper connected to the positive potential source is applied to the respective one of conductors 22-0 through 23-15. At the end of the announcement when the respective wiper connected to the negative potential source is applied to this conductor the gating device may cause relay B to release. In this manner announcements of variable lengths may be read out. Thus it is to be understood that the above-described arrangement is only illustrative of the application of the principles of the invention. Numerous other arrangements may be devised by those skilled in the art without departing from the spirit and scope of the invention.

What is claimed is:

1. An announcement machine for a weighing mechanism comprising a recording containing thereon a sequence of pound announcements followed by a sequence of ounce announcements, first and second means for registering respectively the number of pounds and the number of ounces of an object being weighed, read-out means for successively reading out said announcements at a first rate, speaker means connected to said read-out means, means for controlling the slowing down of the read-out of said announcements to a second rate when the announcements being read out from the recording are those which correspond to values registered in said first and second registering means, and means for enabling said speaker means only when the announcements being read out from the recording are those which correspond to values registered in said first and second registering means.

2. An announcement machine for a weighing mechanism in accordance with claim 1 wherein said read-out means includes a motor for moving said recording at said first rate and said controlling means for slowing down said read-out includes means for causing said motor to operate at said second slower rate.

3. An announcement machine for a weighing mechanism comprising recording means containing thereon a plurality of pound and ounce announcements, means for registering pound-ounce combinations, read-out means for reading out all of said announcements during each operation of said weighing mechanism, and means for rendering audible only the pound and ounce announcements comprising the registered combinations.

4. An accouncement machine for a weighing mechanism in accordance with claim 3 further including means for controlling the normal read-out of said announcements at a first speed, and means for controlling the read-out of said announcements comprising said registered combinations at a second slower speed.

5. An announcement machine comprising recording means containing thereon a plurality of groups of announcements, means for registering announcement combinations consisting of selected announcements in at least tfo of said groups, read-out means for reading out all of said announcements during each operation of said announcement machine, and means for rendering audible only said selected announcements.

6. An announcement machine in accordance with claim 5 further including means for controlling the normal read-out of said announcements at a first speed, and means for controlling the read-out of said selected announcements at a second slower speed.

7. An announcement mechanism for a weighing machine comprising first and second registering means for respectively registering the number of pounds and the number of ounces of an object being weighed, recording means containing thereon a series of pound and ounce announcements, read-out means for successively reading out said announcements at a first rate, and means for controlling the slowing down of the read-out of said announcements when the announcements being read out from the recording are those which correspond to values registered in said first and second registering means.

8. An announcement mechanism for a weighing machine in accordance with claim 7 further including means for rendering subaudible the announcements read out at said first rate.

9. An announcement machine comprising a recording containing thereon a continuous sequence of announcements, read-out means for reading out each of said announcements in sequence at a normal first speed, means for identifying particular ones of said announcements, and means for controlling the read-out of those announcements identified by said identifying means at a second slower speed.

10. An announcement machine in accordance with claim 9 further including means for rendering subaudible those of said announcements read out at said first speed.

11. An announcement machine in accordance with claim 10 further including means for reading out all of said announcements at least once in each cycle of operation of said announcement machine, and means for rendering subaudible those announcements identified in said identifying means after said identified announcements have been read out a first time.

12. An announcement machine comprising recording means containing thereon a plurality of announcements, read-out means for reading out all of said announcements during each operation of said announcement machine, means for selectively registering which of said announcements are to be audible, and means for rendering audible only the registered announcements.

13. An announcement machine comprising recording means containing thereon a plurality of announcements, read-out means for reading out said announcements, means for registering selected ones of said announcements, means for controlling the read-out of said registered announcements at a first speed, and means for controlling the read-out of the others of said announcements at a second speed.

References Cited in the file of this patent

UNITED STATES PATENTS

| | | |
|---|---|---|
| 803,125 | McIntire | Oct. 31, 1905 |
| 2,065,964 | Brown | Dec. 29, 1936 |